United States Patent
Anderson et al.

[11] 3,777,198
[45] Dec. 4, 1973

[54] INSULATED COIL FOR ARRANGEMENT IN A SLOT IN THE STATOR OR ROTOR OF AN ELECTRIC MACHINE

[75] Inventors: Anders R. Anderson; Anders Bjorklund, both of Vasteras, Sweden

[73] Assignee: Allamanna Svenska Electriska Aktiebolaget, Vasteras, Sweden

[22] Filed: July 10, 1972

[21] Appl. No.: 270,440

[52] U.S. Cl. .................................. 310/200, 310/43
[51] Int. Cl. .............................................. H02k 3/00
[58] Field of Search ...................... 310/179, 43, 45, 310/196, 200, 201, 214–218; 174/73, 117 F, 73.1, 110; 156/52, 53, 54; 336/206, 223

[56] References Cited
UNITED STATES PATENTS

| 3,287,580 | 11/1966 | Broniewski | 310/201 |
| 3,079,519 | 2/1963 | Kitson | 310/45 |
| 2,705,292 | 3/1955 | Wagenseil | 310/196 |
| 1,784,989 | 12/1930 | Hill | 310/196 |
| 2,436,306 | 2/1948 | Johnson | 310/196 |
| 2,427,749 | 9/1947 | Schulman | 310/196 |
| 2,318,074 | 5/1943 | Hill | 310/196 |

Primary Examiner—R. Skudy
Attorney—Jennings Bailey, Jr.

[57] ABSTRACT

A coil positioned in the slot of a stator or rotor in an electric machine is formed of a bundle of conductors arranged close together and insulated from each other and from the slot. The conductor insulation consists of a layer of polymer and a tape of corona resistant insulating material running longitudinally of the conductor is adhered to the polymer layer. The tape surrounds the parts of the conductor facing the main insulation which surrounds the bundle of conductors and furthermore overlies at least those parts of the sides of the conductors which face the adjacent conductors which parts are situated nearest the sides facing the main insulation.

15 Claims, 8 Drawing Figures

PATENTED DEC 4 1973   3,777,198
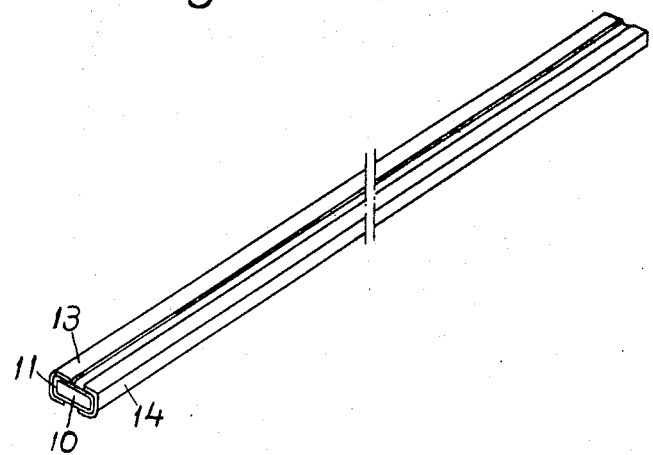
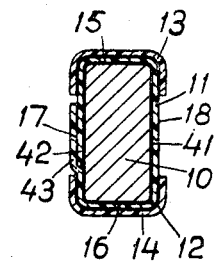
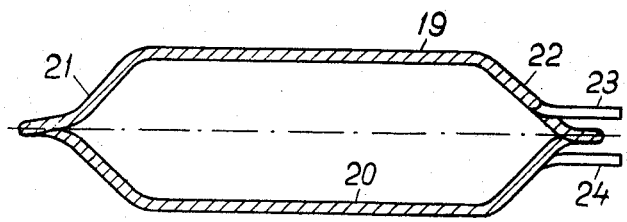
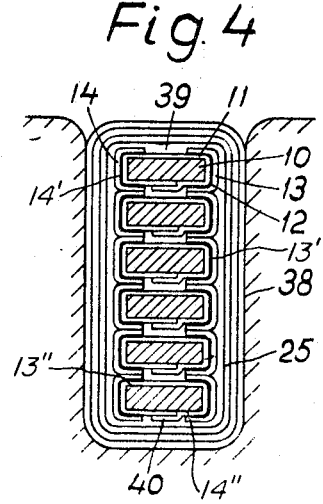
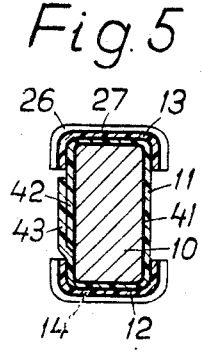
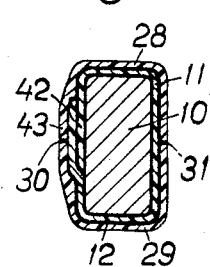
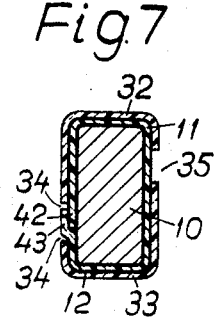
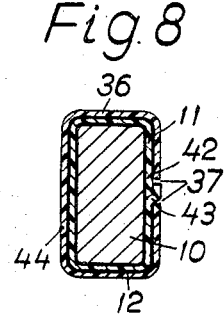

INSULATED COIL FOR ARRANGEMENT IN A SLOT IN THE STATOR OR ROTOR OF AN ELECTRIC MACHINE

BACKGROUND OF THE INVENTION

1. Field of the Invention

The invention relates to an insulated coil for arrangement in a slot of a stator or rotor of an electric machine.

2. The Prior Art

A coil which is arranged in s alot in the stator or rotor of an electric machine often comprises a bundle of several conductors arranged close together and provided with a conductor insulation to insulate the conductors from each other. The bundle may consist of turns of a single insulated conductor. It may also consist of several separate insulated conductors (strands) which are electrically connected, usually parallel-connected, to each other at the ends.

The conductor bundle is surrounded by a main insulation to insulate the bundle from the machine slot which has earth potential. The main insulation usually includes material which has strong resistance to corona attack, for example mica or silicon rubber and there are normally impregnating and pressing operations during its application around the bundle of conductors so that an insulation is obtained having no voids and tightly surrounding the conductor bundle.

In practice it has been impossible to ensure the manufacture of coil insulations which are permanently free from inner spaces where corona may occur. The occurrence of small gas-filled voids even during the manufacture of the insulation cannot be completely avoided. Furthermore, voids and gaps in the insulation may arise as a result of ageing phenomena due to thermal and mechanical stresses during operation. In this case the boundary layer between the conductor insulation and main insulation is particularly subject to stresses since the temperature is highest nearest the conductor and because of the mechanical stresses which arise with temperature alterations since the coefficients of thermal expansion for conductor and insulation are different.

When corona arises which affects the conductor insulation there is great risk of its being destroyed and weakened so that short-circuiting between adjacent turns of a single insulated conductor or short-circuiting between strands may occur. In order to avoid this risk a conductor insulation is aimed at which has strong resistance to corona attack. A conventional embodiment of conductor insulation which also provides corona protection is one in which the conductor is wrapped with mica tape consisting of mica flakes attached usually with a resinous binder to a carrier material of glass cloth, for example. With respect to the occurrence of temporary steep over-voltages, for example connection over-voltages, which may cause great stress between adjacent turns in a coil, the requirements of the electrical strength of the conductor insulation are extremely high seen in relation to the stress occurring during normal operation. A normal rule is that insulation between adjacent turns shall be dimensioned to withstand a voltage equal to the rated voltage of the machine. In order to achieve sufficient electric strength with conductor insulation of conventional mica tape, a relatively thick insulation is required which is effected by winding on several layers of tape. This conductor insulation has several disadvantages. It requires considerable space, is expensive and the insulation is easily damaged by folds and cracks arising during the bending process or during other handling of the conductor while shaping the coil. Another type of conductor insulation where these disadvantages are less pronounced is an embodiment in which the insulation of the conductor consists of a layer of enamel of a type normally used for enamelling conducting wire and a wrapping of mica tape applied outside this enamel as corona protection. Because of the high electric strength of the wire enamel layer, the total thickness of the insulation can in this case be kept lower than when the conductor is only wrapped with mica tape. In order effectively to protect the enamel layer against corona and at the same time contribute somewhat to the electric strength, the outer wrapping of tape must be carried out with overlap between adjacent turns of the tape. In this case also the tape wrapping causes problems when the conductors are being bent. If the tape is loosely bound to the enamel layer below it, it has a tendency to slide apart when the conductor is bent. If, on the other hand, the tape is firmly attached to the layer of enamel, cracks may easily occur during the bending.

It is extremely desirable for the insulation and corona protection around the conductor to be as thin and take as little space as possible. In this way more conductor material can be incorporated in the coil and a greater effect is achieved for a given machine dimension or for a given effect the machine dimension can be reduced. The application of Andersson et al, Ser. No. 82,953 filed Oct. 22, 1970 relates to an arrangement of a similar nature in which however the conductors have a coating of enamel as contrast with the coating of a polymer which is used in accordance with the present application.

According to the present invention it has been discovered that it is possible to use considerably thinner conductor insulation in coils of the type described than in previously known coils and at the same time achieve equally good electrical qualities in the coils.

The present invention relates to a coil to be arranged in the slot of a stator or rotor in an electric machine, comprising a bundle of several conductors arranged close together and provided with conductor insulation to insulate the conductors from each other and a main insulation surrounding the bundle to insulate the bundle from the machine slot, the conductors having sides facing each other and at least one side facing the main insulation, characterised in that the conductor has a conductor insulation in the form of a prefabricated film of a polymer on the conductor and that a tape of corona-resistant insulating material running in the longitudinal direction of the conductor and attached to the polymer film of the conductor is arranged to surround said side of the conductor facing the main insulation and at least those parts of the sides of the conductor facing adjacent conductors which are situated nearest said side facing the main insulation.

The invention also relates to a method of manufacturing such a coil, the method being characterised in that a substantially straight conductor is surrounded by a prefabricated film of a polymer acting as conductor insulation, after which a tape of corona-resistant insulating material is applied in the longitudinal direction of the conductor and attached to the polymer film of the conductor in such a way that the tape surrounds at least one side of the conductor which is intended to face the main insulation of the coil and at least those parts of the sides of the conductor situated nearest said side which are intended to face adjacent conductors in the coil and the conductor is then bent to provide end parts and slot parts of the coil and several bent conductors are arranged close to each other to form a bundle and the bundle is surrounded by the main insulation of the coil.

The explanation of the more effective use of the corona-resistant insulating material which is achieved according to the present invention is that joints and gaps are avoided between parts of this insulating material where the stresses are greatest. According to the present invention it is possible in this region, with only one layer of the corona-resistant insulating material, to achieve effective corona protection, whereas, when winding normally, at least two layers must be used since the tape must be applied with overlap between adjacent turns. According to the invention, therefore, the outer dimensions of the conductor bundle are considerably less than for a corresponding conductor bundle in which an identical tape of insulating material has been wound around the conductor with overlap in conventional manner. The fact that joints or gaps occur according to the present invention between the corona-resistant material along the sides of the conductors in the coil described which are facing each other has not proved to be any disadvantage. This is explained because the stresses between the conductors are low during normal operation and any over-voltages which arise are very brief, as mentioned previously. The present invention is specifically intended for use in electric machines and apparatus for operational voltages above 3 kV because of the problems arising with corona in such machines.

The conductor bundle may consist of several turns of a single insulated conductor which is bent to give the final shape of the bundle. It may also consist of several separate insulated conductors, often called strands, which are electrically joined to each other, usually parallel-connected, at their ends. The invention is particularly advantageous for the first-mentioned type of conductor bundle, since the stresses between adjacent conductors in this case are greater and short-circuiting due to damaged conductor insulation is more serious.

The main insulation may be designed in various well known ways and its construction does not form any part of the present invention. It may, for example consist of a bandage of mica tape or mica sheet. These may be made of large mica flakes of conventional type which are attached, for example with a resinous binder such as an alkyd resin or a thin thermoplastic film, to a carrier material of paper, glass cloth or the like. The mica material may also consist of a self-carrying tape or sheets of small mica flakes overlapping each other, manufactured by splitting ordinary mica. In this case the mica material is usually attached to a carrier material as well.

A binder may be applied on said mica tapes or sheets which, when the material is later applied around the conductor bundle, binds the various layers of the conductor insulation to each other. However, such a binder may even be supplied after the insulating material has been applied around the conductor bundle by means of an impregnation. As examples of suitable binder for the turns in the wrapping may be mentioned solventless resins such as epoxy resins and unsaturated polyester resins.

The main insulation may alternatively consist of silicon rubber, for example, applied in the form of a strip or paste around the bundle of conductors.

As mentioned, the conductor insulation consists of a prefabricated film of a polymer. The polymer may be a linear unbranched or branched polymer having such thermal stability that the dielectric strength of a film of the polymer 50 microns in thickness, after ageing in air at 155°C for 25,000 hours, is at least 50 percent of the dielectric strength before the ageing. The dielectric strength can be determined according to VDE 0345/1.65 Para. 17. Examples of suitable polymers are polyamide imides, polyimides, polymers based on polyhydantoin, polyethylene glycol terephthalate, polycarbonate and polysulphon.

The conductor insulation preferably has a thickness of 5 – 200 microns.

The polymer is preferably applied in the form of a film wider than the circumference of the conductor, the film being arranged in the longitudinal direction of the conductor and folded around the conductor with the edges overlapping each other. It is also possible to wind the film around the conductor. The film is suitably fixed to the conductor with a poreless resinous binder having high rupture elongation and good stiffness. As examples of suitagle resinous binders may be mentioned flexible polyurethane resins, epoxy resins modified with polyamides, polyester resins modified with isocyanates, epoxy resins modified with polyurethane resins, certain types of rubber and fluorinated copolymers of polythene and polypropene.

The tape of corona-resistant material is preferably formed of a mixture of small mica flakes and short fibres of a linear polymer such as pplyamide, aromatic polyamide, polyethylene glycol terephthalate, polyacrylate, polyurethane and polyacrylnitrile. It is also possible to use fibers of cellulose and glass instead of or as well as polymer fibres. The percentage of mica is suitably 10 – 90, preferably 30 – 70 percent, and the precentage of fibres suitably 10 – 90, preferably 30 – 70 percent, of the total weight of mica and fibres. Such mica flakes which have a size less than 5 mm², usually less than 2 mm² can be manufactured according to known methods by splitting ordinary mica, for example by first heating the mica and then subjecting it alternately to the action of two solutions which react with each other producing gas. The split mica then has such properties that is can be mixed with water into a pulp. Fibres can then be mixed into this pulp and the mixture of components can be shaped to a sheet of material according to methods similar to those used in the manufacture of paper. The fibres have suitably a length of 0.5 – 25, preferably 1 – 10 mm and a thickness of 1 – 50, preferably 5 – 25 microns. The tape may also consist of only small mica flakes of the type described. Instead of mica flakes it is also possible to use thin flakes of glass. It is also possible to reinforce the tape mechanically, for example with a thin cloth or mat of a fibrous material such as glass fibre, suitably applied on one side of the tape.

The thickness of the tape is suitably 10 – 200 microns, preferably 25 – 125 microns.

It is advantageous if the tape has a high elongation at rupture so that no damage occurs when the insulated conductor is bent. The elongation at rupture of the tape described can be increased by impregnating it with a flexible resin, such as a flexible polyurathane resin, a flexible alkyd resin, a flexible epoxy resin or a flexible silicon resin.

The resistance of the tape to rupture can also be increased by attaching it to the conductor insulation along its entire contact surface with the insulation. A resinous binder may preferably be used for the attachment, which has high elongation at rupture and good stiffness. Theresinous binder should be pore-free so that corona will not arise and it should also have the ability to effectively bind every point of the tape to the conductor insulation so that a mechanical stress arising when the conductor is bent is distributed evenly along the entire length of the tape. As examples of suitable resinous binders may be mentioned flexible polyurethane resins, epoxy resins modified with polyamides, polyester resins modified with isocyanates, epoxy resins modified with polyurethane resin and certain types of rubber.

Another way of increasing the strength of the tape against rupture is to apply a film of a polymer along the entire outer surface of the tape. The purpose of the film is to act as support for the tape during the bending and to distribute a mechanical stress arising in the tape during the bending evenly along the entire length of the tape. The film can be bound to the tape by a resinous binder of the type exemplified previously. As examples of suitable polymers in the film may be mentioned polyethylene glycol terephthalate, polycarbonate, polyamide, polypropene, polyphenylenoxide and polyacryl nitrile. If the conductor has two sides facing the main insulation it may be advantageous to use one tape for each side instead of using one tape which surrounds both sides. Thus, when the conductor is bent the tape on one of said sides does not affect the tape on the other side since there is no connecting part of the tape. Mechanical stresses on one tape are therefore not transferred to the other tape.

BRIEF DESCRIPTION OF THE DRAWING

The invention will be described in more detail by means of a number of examples with reference to the accompanying drawings in which FIG. 1 shows in perspective a conductor according to the invention provided with conductor insulation and tape of corona-resistant insulating material prior to bending, FIG. 2 the same conductor in cross section on a larger scale, FIG. 3 a side view of a coil produced by bending the conductor according to FIGS. 1 and 2 and provided with main insulation, FIG. 4 the same coil in cross section and FIGS. 5 – 8 alternative embodiments of the conductor according to FIGS. 1 and 2 shown in cross section. The thicknesses of the conductor insulations and corona-resistant insulating material are greatly exaggerated in the drawings.

DESCRIPTION OF THE PREFERRED EMBODIMENTS

Example 1

On a polyamide imide film 25 mm wide and 40 microns thick (Film 700 from Rhone-Poulenc, France) is applied on one side a resinous binder consisting of an epoxy resin modified with a polyamide (for example "AF-42" from Minnesota Mining and Manufacturing Company, USA). The resin is dissolved in a solvent and coated on in a thin layer. When the solvent has evaporated, the tape is applied with the resinous binder 41 facing inwards, along the conductor 10 which is 3 × 8 mm so that the edges 42 and 43 (FIG. 2) overlap each other in the longitudinal direction of the conductor. The product thus formed is then placed in a moulding tool and subjected to heating to 165°C for 30 minutes while being also subjected to pressure so that the film is firmly fixed to the conductor via the resinous binder and forms a conductor insulation 11.

A thin layer of resinous binder 12 (not shown in FIG. 1) is applied outside the conductor insulation in the same way as previously described for the layer 41, it also being of the same type. When the solvent has evaporated a tape 13, 14, respectively, of the corona-resistant insulating material is applied along each of the short sides 15, 16, respectively, of the conductor and the parts of the long sides 17, 18, respectively, situated nearest these sides. The product thus formed is than placed in a moulding tool and subjected to heating to 165°C for 30 minutes under pressure so that the tape is effectively attached to the conductor insulation by means of the resinous binder. The tape, which has a width of 7 mm and a thickness of 75 microns consists of a mat built up of a mixture of equal parts by weight of small mica flakes and short fibres of an aromatic polyamide (for example a mat NOMEX from DuPont, USA).

The conductor provided with corona-resistant insulating material is bent to a coil having several turns of the conductor lying close to each other as shown in FIGS. 3 and 4, respectively. (These figures show the coil when the main insulation has been applied.) The said turns of the conductor lying close together form the conductor bundle of the coil. As is clear from FIG. 3 the conductor is bent so that the coil has straight parts 19 and 20 intended to be placed in the machine slots and curved end parts 21 and 22 which extend outside the slots. The terminals of the coil are designated 23 and 24.

The conductor bundle is then wrapped by turns with, for example half overlap, with a 25 mm wide mica tape consisting of a 0.09 mm thick self-carrying layer of small mica flakes overlapping each other fixed to a 0.04 mm thick woven glass tape with 0.006 mm thick polyethylene glycol terephthalate foil. Such an insulating tape is described in British Patent No. 939,747. When the bundle has been provided with a wrapping 25 of, for example, thirty layers of mica tape one on top of the other, the winding is dried first at a pressure of 0.1 mm Hg and a temperature of 40°C, after which an impregnating resin is supplied at the same pressure. When all the impregnating resin has been supplied, the pressure is raised to, for example 25 kg/cm$^2$. The impregnating resin may consist of an epoxy resin consisting, for example of 85 parts "Araldit F," 100 parts "Curing agent 905" (both from Ciba AG, Switzerland) and 15 parts phenyl glycidyl ether. So that the impregnating resin shall not penetrate out of the insulation during the subsequent curing process the impregnated conductor bundle with the wrapping of mica tape may be surrounded with a sealing tape of polytetrafluoroethylene or the like. The coil is then placed in a moulding tool to cure the impregnating resin. Curing takes place at a temperature of about 160°C for 4 to 6 hours. The coil is applied with the straight slot parts in the machine slot 38 as shown in FIG. 4. No corona-resistant material is necessary on the sides 39 and 40 of the outer conductors facing outwardly in the bundle since short-circuiting between conductors cannot occur here.

EXAMPLE 2

A polyimide film (KAPTON from Du Pont, USA), 76 microns thick and 25 mm wide, coated on one side with a thin layer of fluorinated ethylene-propylene copolymer (TEFLON FEP from Du Pont, USA) is applied along a copper conductor 10 which is 3 × 8 mm, with the fluorinated polymer facing inwards. A thin asbestos tape is wound with half overlap around the conductor to keep the film in position and in good contact with the surface of the conductor. The conductor is then passed through a high-frequency loop so that the copper is heated to 350°C, i.e. so that the layer of fluorinated copolymer melts. When the conductor cools, said layer solidifies and good adhesion is obtained between the polyimide film and the metal and between the polyimide films in overlapping zones.

The polyimide films thus provides a conductor insulating 11 having overlapping edges 42 and 43 as shown in FIG. 2. The fluorinated polymer comprises the resinous binder 41.

Tapes of corona-resistant insulating material 13 and 14 and the wrapping 25 as well as the impregnating resin are then applied in the manner described in Example 1.

EXAMPLE 3

A conductor provided with conductor insulation 11 and having the same dimensions as in Example 1 is manufactured. However, instead of copper, aluminium is used for the conductor. Furthermore, as resinous binder 41 for attaching the polyamide imide film 11 to the conductor 10 a resinous binder is used consisting of 74 parts by weight of a copolymerisate of equal parts polyhexamethylene adipamide and polykaprolactam having an average molecular weight of about 25,000 and 24 parts by weight of an epoxy resin consisting of a diglycidyl ether of bisphenol A having an epoxy equivalent weight of 190 (for example DER 331 from Dow Chemical, USA) and 2 parts by weight dicyandiamide. When being applied, the resinous binder is used dissolved to a 25 percent solution in equal parts by weight of methanol and trichloroethylene.

When the resinous binder has been applied on the polyamide imide film the solvent is evaporated at about 80°C.

During the subsequent attachment of the polymer film, the conductor is heated in the moulding tool to about 200°C for about a minute, whereupon the resinous binder melts and is cured.

The polyamide imide film gives a conductor insulating 11 with overlapping edges 42 and 43 as shown in FIG. 2.

Tapes of corona-resistant insulating material 13 and 14, the wrapping 25 and the impregnating resin are than applied in the manner described in Example 1. The resinous binder 12 is, however, of the same type as the resinous binder 41 described in Example 3.

EXAMPLE 4

On a copper conductor 10, 3 × 8 mm in dimension, a resinous binder 41 is applied which has been produced in the following manner: 130 parts by weight Desmodur L (BAYER AG, Germany) in a 75 percent ethyl acetate solution are mixed with 100 parts by weight Desmorapid LA (BAYER AG, Germany). In order to achieve a thin layer of adhesive, the mixture is diluted with 30 parts by weight ethyl acetate.

When the adhesive has been applied the solvent is evaporated either at ambient temperature or at a raised temperature, for example 50°C. A tape 40 microns in thickness and 25 mm wide based on polyhydantoin (for example IDO 4089 from BAYER AG) is then applied along the conductor.

In order to obtain a bond between the films at the overlapping edges 42 and 43, resinous binder is also applied here.

When the film has been placed on the conductor a pressure of 20 kg/cm$^2$ is applied for about 20 minutes at ambient temperature. In order to achieve optimum strength and temperature resistance, the conductor is subsequently cured for 3–4 minutes at 180°C.

The polymer film gives a conductor insulating 11 as shown in FIG. 2. Tapes of corona-resistant insulating material 13 and 14, the wrapping 25 and the impregnating resin are applied in the manner described in Example 1.

EXAMPLE 5

A copper conductor 10 provided with conductor insulating 11 is manufactured in the manner described in Example 1 except that instead of the film described there a film is used consisting of polyimide (KAPTON from Du Pont, USA), 76 microns thick and 25 mm wide, on one side of which a resinous binder of polyimide type (PI 4701 from Du Pont, USA) is applied. When the solvent has evaporated at 100°C for 30 minutes the wrapping is applied in the same manner as in Example 1 and cured in a moulding tool at a temperature of 315°C for 30 minutes.

The polymer film gives a conductor insulating 11 having overlapping edges 42 and 43 as shown in FIG. 2.

Tapes of corona-resistant insulating material 13 and 14, the wrapping 25 and the impregnating resin are then applied in the manner indicated in Example 1.

EXAMPLE 6

A copper conductor 10 provided with conducting insulation 11 is manufactured in the manner indicated in Example 1 with the difference that instead of the film described there a polyethylene terephthalate film (for example Mylar Type C from Du Pont, USA) is used, the film having a thickness of 51 microns and being 25 mm wide. A binder of the nitrile rubber type (for example 4684 from Du Pont, USA) is used as the resinous binder 41. Curing in the moulding tool may be carried out at 160°C for 1 minute.

The polymer film provides a conductor insulation 11 having overlapping edges 42 and 43 as shown in FIG. 2.

The tape of corona-resistant insulating material 13 and 14, wrapping 25 and impregnating resin are then applied in the manner described in Example 1. The resinous binder 12, however, is of the same type as the resinous binder 41 described in this Example 6.

EXAMPLE 7

A copper conductor 10 provided with conductor insulation 11 is manufactured in the manner described in Example 1, except that instead of the film used there a polycarbonate film (for example Makrofol KG (polyester of bisphenol A and carbonic acid) from BAYER AG, Germany) 60 microns thick and 25 mm wide is used. The binder used is the same as the resinous binder 41 mentioned in Example 3. The conductor is heated in the moulding tool to 170°C for 30 minutes and is allowed to cool in the tool.

The polymer film provides a conductor insulating 11 with overlapping edges 42 and 43 as shown in FIG. 2.

The tape of corona-resistant insulating material 13 and 14, the wrapping 25 and the impregnating resin are then applied in the manner indicated in Example 1. The resinous binder 12, however, is of the same type as the resinous binder 41 described in this Example 7.

EXAMPLE 8

A copper conductor 10 provided with conductor insulation 11 is manufactured in the manner indicated in Example 1, except that instead of the film described there a polysulphon film (for example Folacron (polyether of bisphenol A and diphenylensulphon) from Folex AG, Switzerland) 50 microns thick and 25 mm wide is used. As resinous binder 41 the same binder is used as in Example 1 and the curing is preformed at 165°C for 30 minutes under pressure, whereupon the film is firmly fixed to the conductor by means of the resinous binder.

The polymer film provides a conductor insulation 11 having overlapping edges 42 and 43 as shown in FIG. 2.

The tapes of corona-resistant insulating material 13 and 14, the wrapping 25 and impregnating resin are then applied in the manner described in Example 1.

EXAMPLE 9

A coil is manufactured in the manner indicated in Example 1, with the difference that a film 26 of a polymer is applied outside each tape of corona-resistant insulating material, as shown in FIG. 5. The film consists of a 10 micron thick polyethylene glycolterephthalate foil which is bound to the tape below by means of a layer 27 of the same resinous binder as that with which the tape is attached to the conductor insulation.

EXAMPLE 10

A coil is manufactured in the manner described in Example 1 with the difference that instead of the tape of corona-resistant insulating material described there, a similar tape is used which has been impregnated with a polyester resin modified with isocyanate. A solution of such a resin can be manufactured from a mixture of 333 parts by weight Desmophen 1670 (Farbenfabriken Bayer, Germany), 167 parts by weight Desmodur CT Stabil, 275 parts by weight diacetone alchol, 75 parts by weight butyl acetate and 150 parts by weight xylene. When the tape has been impregnated it is dried at 180°C for 10 minutes.

EXAMPLE 11

A coil is manufactured in the manner described in Example 1, but instead of the tape of corona-resistant insulating material described there, a tape of the same width and thickness is used consisting only of small mica flakes overlapping each other, instead of the resinous binder to attach the tape to the conductor insulation a resinous binder is used consisting of 65 parts by weight of a copolymerisate of equal parts polyhexamethylene adipamide and polykaprolactam having an average molecular weight of about 25,000, 23 parts by weight of an epoxy resin consisting of diglycidylether of bisphenol A with an epoxy equivalent of 190 and 2 parts by weight dicyandiamide. When being applied the resinous binder is used dissolved to a 25 percent solution in equal parts by weight methanol and trichloroethylene. Application is performed in the manner described in Example 1.

Furthermore, as impregnating resin in the main insulation an unsaturated polyester resin is used manufactured from adipic acid (11 mole %), phthalic acid anhydride (11 mole %) maleic acid anhydride (23 mole %) and ethylene glycol (55 mole %) and provided with diallyl phthalate in such a quantity that the diallyl phthalate comprises 40 percent of the total weight of polyester resin and diallyl phthalate and also with benzoyl peroxide in a quantity corresponding to 1 percent of the weight of the mixture. The polyester resin itself is manufactured by reaction of a mixture of said acids and the alcohol in inert atmosphere by increasing the temperature to 220°C and maintaining this temperature until the acid number of the reaction product is about 30. The coil is dried prior to impregnation at a pressure of less than 1 mm Hg and the resin is cured after the impregnation at a temperature of 130°C for 1 hour.

EXAMPLE 12

A coil is manufactured in the manner described in Example 11. However, the mica tape used is impregnated in the manner described in Example 10 and a film of polymer is applied outside the tape in the manner indicated in Example 9.

EXAMPLE 13

A coil is manufactured in the manner described in Example 1 with the difference that instead of the tape of corona-resistant insulating material described there an otherwise similar tape is used which is 11 mm wide. Thus, the tape 28 or 29 applied around each short side of the conductor will lie edge to edge with the tape applied around the corresponding short side, as can be seen in FIG. 6.

The points at which the edges of the tapes meet each other on the long sides of the conductor are designated 30 and 31.

EXAMPLE 14

A coil is manufactured in the manner described in Example 1 with the difference that instead of the corona-resistant insulating material described there an otherwise similar tape is used which is 9 mm wide. Furthermore, the polymer film has a width of 23.5 mm. Each tape 32 and 33 is applied as can be seen in FIG. 7 displaced in relation to a plane through the middle of the short sides of the conductor so that the gaps 34 and 35 between the edges of the tapes will be located on opposite sides of a plane through the middle of the long sides of the conductor. In this way the gaps in two adjacent conductors will not in any way coincide. The corona-resistant material is thus also used as insulation between the conductors. Of course the gaps 34 and 35 may be zero as shown in FIG. 6, i.e. the two edges may meet each other on both sides of the conductor, but on opposite sides of the plane through the middle of the long sides.

EXAMPLE 15

A coil is manufactured in the manner indicated in Example 1 with the exception that instead of the tape described there an otherwise similar tape 36 is used which is 20 mm wide. The polymer film has a width of 23.5 mm. The tape 36 surrounds both the sides of the conductor facing the main insulation and neighbouring parts of sides facing adjacent conductors, as well as one side facing an adjacent conductor, as shown in FIG. 8. The gap between the edges of the tape is designated 37. It may be suitable to make a rupture indication 44, for example a cut through part of the thickness of the tape 36 on the side of the conductor which the tape surrounds and which is facing an adjacent conductor, so that any rupture caused by tensile stresses will occur on a side which is not facing the main insulation.

Of course the coils described in the Examples may be manufactured using mica tape with large mica flakes for the main insulating, as well as other commercially available completely polymerisable resins and even, for instance, asphalt. Although many unsaturated polyester resins and epoxy resins suitable for impregnating electrical insulations are known, a few more examples will be mentioned. For example: an impregnating resin consisting of 60 parts by weight of a reaction product of 3 mole maleic acid anyhdride, 1 mole adipic acid, 4.4 mole ethylene glycol, manufactured according to the previously described process, having an acid number of 30 and 40 parts by weight diallyl phthalate, containing 0.75 percent benzoyl peroxide, or an impregnating resin consisting of 70 parts by weight of a reaction product of 1 mole fumaric acid, 1 mole phthalic acid and 2.2 mole propylene glycol reacted to an acid number of 25 and of 30 parts by weight monostyrene, containing 0.5 percent benzoyl peroxide. Among suitable epoxy resins may be mentioned a product consisting of 100 parts by weight "Epon 828" (Shell Chemical Co) and 65 parts by weight hexahydrophthalic acid anhydride, or a product consisting of 100 parts by weight "Dow 331" (Dow Chemical Co) and 65 parts by weight tetrahydrophthalic acid anhydride.

Thus the first and second opposite sides of the conductor, the vertical sides 13' and 14' in FIG. 4 are surrounded by tape (either a single tape or two tapes) while overlies at least those parts of the third and fourth sides, the horizontal sides 13' and 14', adjacent the first and second sides.

It will also be apparent in FIG. 7 that the gap between the edges of the parts of the tapes overlying one of the third and fourth sides is located on the opposite side of the central longitudinal plans through the middle of the third and fourth sides from the gap between the edges of the parts of the tape overlying the other of the third and fourth sides. When assembling several such conductors on top of each other in the slot shown in FIG. 4, the gap on one of the third and fourth sides of a conductor will not cover the gap on the other of the third and fourth sides of the adjacent conductor, this last-mentioned side being adjacent said one side of the first-mentioned conductor. The corona-resistant material thus also acts as insulation between the conductors. This condition may also exist when the tapes completely surround the conductor, that is, the joints 30 and 31 in FIG. 6 may be displaced on opposite sides of such plane.

We claim:

1. Insulated electrical conductor having substantially rectangular cross-section, in which the insulation comprises a prefabricated film of a polymer on the conductor and tape of corona-resistant insulating material attached to the polymer film and running parallel to the longitudinal axis of the conductor, said tape surrounding first and second opposite sides of the conductor and overlying at least those parts of the third and fourth sides adjacent the first and second sides while leaving part of at least one of said third and fourth sides exposed.

2. Conductor as claimed in claim 1, in which said tape comprises two tapes surrounding the first and second sides.

3. Conductor as claimed in claim 2, in which said two tapes overly parts only of the third and fourth sides, leaving parts of said sides uncovered.

4. Conductor as claimed in claim 3, in which said uncovered parts lie on opposite sides of a plane extending longitudinally of the conductor and perpendicular to the third and fourth sides.

5. Conductor as claimed in claim 2, in which the edges of the parts of the tapes overlying one of the third and fourth sides lie on the opposite side of a plane extending longitudinally of the conductor and perpendicular to the third and fourth sides from the edges of the parts of the tapes overlying the other of the third and fourth sides.

6. Coil to be arranged in the slot of a stator or rotor in an electric machine, comprising a bundle of conductors arranged close together and provided with conductor insulation to insulate the conductors from each other and main insulation surrounding the bundle to insulate the bundle from the machine slot, the conductors having first sides facing each other and at least one second side facing the main insulation, the conductor having conductor insulation comprising a prefabricated film of a polymer on the conductor and a tape means of corona-resistant insulating material running in the longitudinal direction of the conductor and attached to the polymer film, the tape means surrounding said second side of the conductor facing the main insulation and at least those parts of the first sides of the conductor which are situated nearest said second side.

7. Coil as claimed in claim 6, in which a resinous binder secures the tape means of insulating material to the polymer film of the conductor along its entire area of contact therewith.

8. Coil as claimed in claim 6, having a film of flexible plastic outside the tape means of insulating material.

9. Coil according to claim 6, said tape means comprising a tape of insulating material surrounding said second side of the conductor facing the main insulation and at least those parts of the first sides of the conductor facing adjacent conductors situated nearest this second side, and a second tape of insulating material surrounding a side of the same conductor positioned opposite to said second side of the said conductor and at least those parts of the first sides of the conductor facing adjacent conductors nearest said side positioned opposite to said second side.

10. Coil according to claim 9, the edges of the two tapes terminating on one first side of the conductor being displaced laterally in relation to the edges of the two tapes on the other first side of the adjacent conductor facing the first conductor so that at least one layer of tape is present between the conductors.

11. Electrical machine having a stator or rotor with a slot therein, and having in said slot a coil as claimed in claim 6.

12. Coil as claimed in claim 6 in which said tape means comprises a material from the group of mica and glass.

13. Coil as claimed in claim 6, in which said tape means comprises a mixture of mica in the form of small flakes and fibers of a linear polymer.

14. Coil as claimed in claim 13 in which said polymer is a polyamide.

15. Coil as claimed in claim 6, in which the tape means comprises a single tape surrounding said second side facing the main insulation, one side of the conductor positioned opposite to said second side, one first side and at least those parts of another first side situated nearest said second side and said side positioned opposite to said second side.

* * * * *

UNITED STATES PATENT OFFICE
CERTIFICATE OF CORRECTION

Patent No. 3,777,198        Dated December 4, 1973

Inventor(s) Anders R. Andersson and Anders Bjorklund

It is certified that error appears in the above-identified patent and that said Letters Patent are hereby corrected as shown below:

In the heading, insert:

-- Applicants disclaim the term of the patent after March 27, 1990. --.

-- [30] Foreign Application Priority Data

Sweden    15447    Dec. 2, 1971 --.

Signed and sealed this 18th day of February 1975.

(SEAL)
Attest:

RUTH C. MASON
Attesting Officer

C. MARSHALL DANN
Commissioner of Patents
and Trademarks